No. 733,368. PATENTED JULY 14, 1903.
C. J. CALEY.
HUB AND ROLL-BACK.
APPLICATION FILED APR. 25, 1903.
NO MODEL.
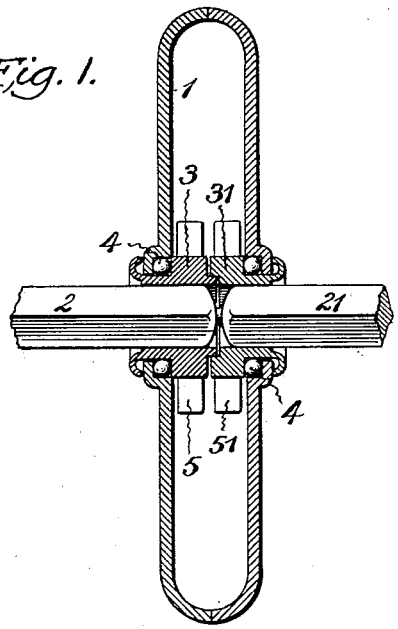
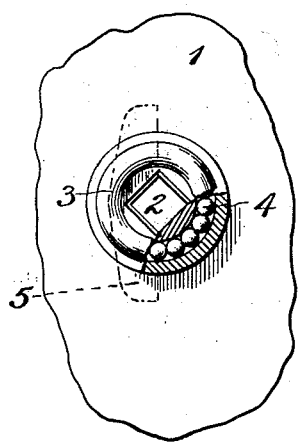
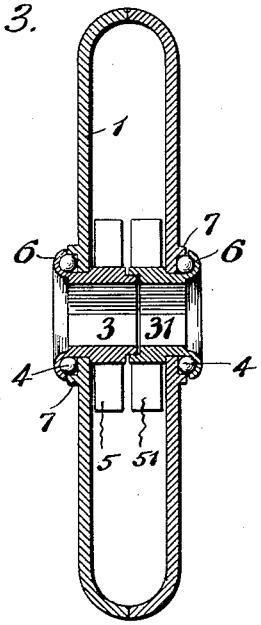
Witnesses
James F. Duhamel
Rob S. Allyn
Inventor
Charles J. Caley
By his Attorney
R. C. Mitchell No. 733,368. Patented July 14, 1903.

UNITED STATES PATENT OFFICE.

CHARLES J. CALEY, OF NEW BRITAIN, CONNECTICUT, ASSIGNOR TO RUSSELL & ERWIN MANUFACTURING COMPANY, OF NEW BRITAIN, CONNECTICUT, A CORPORATION OF CONNECTICUT.

HUB AND ROLL-BACK.

SPECIFICATION forming part of Letters Patent No. 733,368, dated July 14, 1903.

Application filed April 25, 1903. Serial No. 154,239. (No model.)

*To all whom it may concern:*

Be it known that I, CHARLES J. CALEY, a citizen of the United States, residing at New Britain, Hartford county, Connecticut, have invented certain new and useful Improvements in Ball-Bearing Hubs and Roll-Backs, of which the following is a full, clear, and exact description.

My invention relates to improvements in door locks and latches, and particularly to the hub. The hub is that device by which the connection is made with the knob and by which the internal latch or lock mechanism may be operated.

The main object of my invention is to provide an improved construction whereby the hub of a lock may be turned with the greatest ease and freedom, binding or cramping of said part being entirely avoided.

The invention is applicable whether the hub be made in one or more pieces. In the drawings I have shown a hub constructed of two sections.

Figure 1 is a sectional view of a lock-case and hub with the ends of an ordinary swivel-spindle located therein. Fig. 2 is a side elevation of a fragment of a lock-case, showing an end view of the hub, partly broken away and in section. Fig. 3 is a view similar to Fig. 1 and illustrating a modification. In this view the spindle is broken.

1 is a lock-case.

2 21 are the ends of a swivel-spindle.

3 31 are two sections of a hub, each of which takes a bearing in the lock-case 1. The end of one hub-section 3 may be let into a cavity in the end of the other hub-section 31 for the purpose of preserving alinement.

4 4 are antifriction-balls.

There is a ball-race arranged between each hub-section and the lock-case, said race being formed by reducing the end of each section 3 31 and by forming an annular groove in the case next to each end of the hub.

In Fig. 1 it will be seen that the balls 4 are located inside of the lock-case. In this form the outer ends of the hub-sections 3 31 are expanded or spun out to overstand the lock-case. This, however, is not essential, since the case might be held together by a screw or rivet.

5 51 are roll-back extensions ordinarily carried by hubs.

As stated above, the hub may be made in one section, but in the preferred form comprises two sections, either of which may be operated by means of the swivel-spindle.

In Fig. 3 I have shown a modification in which instead of locating the antifriction-balls inside of the lock-case they are located outside. In this construction a shoulder or flange may be arranged on each hub-section 3 31 to retain the balls 4 4 in place. In addition to this shoulder or flange the case may be provided on its outer side with an annular shoulder 7, which serves to further inclose the balls and form the groove or race in which they run.

What I claim is—

1. An improvement in a door lock or latch comprising, a case, hub-openings therein, an annular track adjacent thereto, antifriction-balls arranged therein, and a shoulder on the end of the hub coacting with a part of the case to hold said balls in place in the race when the parts are assembled.

2. An improvement in door locks or latches comprising, a lock-case, a hub-opening therein, a hub arranged in line therewith, a ball-bearing arranged between the end of the hub and the lock-case, balls arranged in said bearing, and means for holding said balls in place.

3. An improvement in door locks and latches comprising, a lock-case, a hub-opening in each side thereof and in line, a hub, said hub being formed of two sections, a spindle-passage through each of said sections, said passages being in line, a ball-bearing arranged at each end of said hub and between said hub and said case, antifriction-balls located therein, and means to hold said balls in place.

4. An improvement in door locks and latches comprising, a lock-case, a hub-opening therein, a hub arranged in line therewith, a ball-bearing or race arranged inside the case, balls arranged in said race and bearing against the hub, and means for holding said balls in place.

Signed at New Britain, Connecticut, this 23d day of April, 1903.

CHAS. J. CALEY.

Witnesses:
   M. S. WIARD,
   W. E. WIGHTMAN.